United States Patent Office 3,468,847
Patented Sept. 23, 1969

3,468,847
CURABLE COPOLYMERS OF PERHALOACETONES AND UNSATURATED EPOXIDES
Harold E. Doorenbos and Harry A. Smith, Midland, Mich., assignors to The Dow Chemical Company, Midland, Mich., a corporation of Delaware
No Drawing. Filed Apr. 17, 1967, Ser. No. 631,169
Int. Cl. C08g 23/06; C08f 11/00
U.S. Cl. 260—63
9 Claims

ABSTRACT OF THE DISCLOSURE

This invention relates to curable interpolymers of a perhaloacetone and an ethylenically unsaturated epoxide which may contain up to about 49 mole percent of a lower alkylene oxide. Such polymers are capable of being cured or crosslinked through the ethyleneic double bond to produce halogen-containing, solvent-resistant plastics or rubbers.

BACKGROUND OF THE INVENTION

Curable copolymers of alkylene oxides such as propylene oxide and ethylenically unsaturated epoxides such as allyl glycidyl ether are known to the art (e.g. J. Polymer Science, 4 (A–1), 1966) and are known to be capable of vulcanization to an insoluble infusible rubbery form useful in the same ways as rubber.

SUMMARY OF THE INVENTION

The interpolymers of this invention provide to the art a new group of perhaloacetone-containing polymers which likewise contain ethylenic unsaturation and are therefore curable to form halogen-containing, solvent-resistant plastics or rubbers.

It is an object of this invention to provide new halogen-containing curable copolymers. Another object is to provide halogen-containing copolymers which contain ethylenic unsaturation and which are capable of being crosslinked or vulcanized to a form of rubber or thermoset polymer. These and other objects and advantages of the present invention will become apparent from a reading of the following detailed description.

The novel compositions of this invention comprise copolymers containing from about 50 to about 67 mole percent of perhaloacetone and from about 33 to about 50 mole percent of an ethylenically unsaturated epoxide. The compositions of this invention also include polymers of perhaloacetones, lower alkylene oxides and ethylenically unsaturated epoxides which contain from about 50 to about 67 mole percent of perhaloacetone and from about 1 to about 50 mole percent of an unsaturated epoxide and up to about 49 mole percent of a lower alkylene oxide, with about 10 to about 25 mole percent of unsaturated epoxide being usually preferred.

BRIEF DESCRIPTION OF PREFERRED EMBODIMENTS

The term "halo" as used herein is meant to include chloro- and fluoro-substituents. Perhaloacetones suitable for use in the present invention include perfluoroacetone (hexafluoroacetone) and perchloroacetone (hexachloroacetone) as well as mixed chloro- and fluoro-perhalosubstituted acetones. Illustrative mixed perhalosubstituted acetones include dichlorotetrafluoroacetone, tetrachlorodifluoroacetone, monochloropentafluoroacetone, and the like.

Ethylenically unsaturated epoxides suitable for use in this invention include allyl glycidyl ether, glycidyl acrylate, butadiene monoepoxide, and the like.

Lower alkylene oxides which may be employed in this invention include those alkylene oxides having from 2 to 4 carbon atoms such as ethylene oxide, propylene oxide, 1,2-butylene oxide, 2,3-butylene oxide, and mixtures thereof.

The polymers of this invention are characterized by being both hydrophobic and oleophobic and in being capable of crosslinking and vulcanization through the ethylenic double bond to form crosslinked or vulcanized hard, rigid or rubber-like polymers having increased softening points and increased solvent resistance which are useful for coatings and molded objects such as gaskets. Suitable crosslinking agents for the copolymers of this invention include standard vulcanization formulations such as sulfur and dicumyl peroxide, difunctional crosslinking agents such as dimercaptans and polyester type crosslinking agents such as styrene.

Generally, the polymers of this invention are prepared by reacting perhaloacetone with an unsaturated epoxide or a mixture of such epoxide with one or more lower alkylene oxides in a substantially anhydrous atmosphere at about room temperature for a period of up to 130 hours or more under autogeneous pressure. It is usually preferred to conduct the reaction in the presence of from about $10^{-7}$ to about $10^{-2}$ mole percent (based on the total reaction mixture) of an alkali metal fluoride as an initiator.

Ordinarily, in preparing the polymers herein the reactants are employed in mole proportions of perhaloacetone/alkylene oxide/ethylenically unsaturated epoxide of from about 1/2.4/0.01 to about 1/0/1 with from about 1/2.3/0.1 to about 1/1.2/1.2 being generally preferred. These materials are reacted at temperatures ranging from about 0° C. to about 50° C., preferably from about 20–40° C. at autogeneous pressure for a period of from a few hours (1–3 hours) to about 720 hours, preferably from about 24 to about 350 hours.

It is usually desirable to conduct the polymerization either in an inert substantially anhydrous atmosphere or wherein the atmosphere is composed of the vapor of one or more of the reactants. Inert solvents or diluents may likewise be employed to moderate the reactions.

The following examples will serve to further illustrate the present invention but are not meant to limit it thereto.

Example 1

Into a dry glass ampoule was added 2.06 gm. of allyl glycidyl ether containing 0.01 gm. of CsF dissolved therein and 3.0 gm. of hexafluoroacetone. The ampoule was then sealed and shaken for 25 days at room temperature. At the end of this period, the ampoule was cooled to −196° C., opened and warmed to room temperature, allowing any volatile components to escape. The remaining product was clear, viscous copolymer oil having an average molecular weight of about 4000. The copolymer product contained about 9 parts by weight of hexafluoroacetone for each 5 parts by weight of allyl glycidyl ether and the quantity of such polymer amounted to a yield of about 93 weight percent.

Example 2

Into a dry ampoule containing 2.06 gm. of allyl glycidyl ether at −196° C. was condensed 3.0 gm. of hexafluoroacetone. The ampoule was sealed, the contents were thoroughly mixed. After heating to about 100° C. for about 16 hours, the ampoule was cooled to −196° C., opened and the volatile components allowed to evaporate as the ampoule warmed to room temperature. The product was a clear viscous oil having a molecular weight of about 4000 and containing 2.78 percent unsaturation as determined by infrared.

Example 3

In a manner similar to that of Example 1, a mixture of 3.0 gm. hexafluoroacetone, 0.01 gm. CsF, 2.5 gm.

propylene oxide and 3.02 gm. of butadiene monoepoxide were sealed in a glass ampoule and allowed to react at room temperature for 6 days. At the end of this period, the ampoule was opened and the volatiles removed. The remaining 6.13 gm. of polymer was colorless and had a softening point below 25° C. Analysis showed such polymer to be heteropolymer of hexafluoroacetone, propylene oxide and BDMO having a number average molecular weight of about 860 and containing olefinic unsaturation.

Example 4

In the manner of Example 1, a mixture of 2.5 gm. of propylene oxide, 3.02 gm. of butadiene monoepoxide, 0.01 gm. of CsF and 3.0 gm. of hexafluoroacetone was placed in a glass ampoule. The ampoule was sealed and the monomers were copolymerized for 6 days at room temperature. At the end of this period, the ampoule was opened and those materials volatile at room temperature were removed. The remaining 6.13 gm. of terpolymer was a clear viscous oil showing ethylenic unsaturation by infrared analysis and was soluble in the common organic solvents such as acetone, ethyl acetate and methyl ethyl ketone.

A 1 gm. portion of this terpolymer product was then mixed with 0.1 gm. sulfur and 0.03 gm. of dicumyl peroxide. The mixture was placed in an oven at 200° C. for 2 hours. At the end of this period, the product was found to have cured into a soft rubbery solid which was infusible and insoluble in the common organic solvents.

Example 5

In the manner of Example 1, a mixture of 1.27 gm. of ethylene oxide, 0.41 gm. of propylene oxide, 0.50 gm. of butadiene monoepoxide, 0.01 gm. of CsF and 3.0 gm. of hexafluoroacetone was placed in a glass ampoule. The ampoule was sealed and the monomers were polymerized for 5 days at room temperature. At the end of this period, the ampoule was opened and those materials volatile at room temperature were removed. The remaining 4.43 gm. of white solid polymer product showed ethylenic unsaturation by infrared analysis, was soluble in organic ketone and ester solvents and had a molecular weight in excess of 7000. When cured with sulfur and dicumyl peroxide, a hard insoluble, infusible polymer is produced.

Various modifications can be made in the present invention without departing from the spirit or scope thereof for it is understood that we limit ourselves only as defined in the appended claims.

We claim:
1. A curable polymer composition consisting of an interpolymer of from about 50 to about 67 mole percent of perhaloacetone, from about 10 to 25 mole percent of an unsaturated epoxide selected from the group consisting of allyl glycidyl ether, glycidyl acrylate, and butadiene monoepoxide and the remainder being a lower alkylene oxide having from 2 to 4 carbon atoms.
2. The curable polymer of claim 1 wherein the perhaloacetone is perfluoroacetone.
3. The curable polymer of claim 1 wherein the unsaturated epoxide is allyl glycidyl ether.
4. The curable polymer of claim 1 wherein the unsaturated epoxide is butadiene monoepoxide.
5. The curable polymer of claim 1 wherein the alkylene oxide is propylene oxide.
6. The curable polymer of claim 1 wherein the perhaloacetone is perfluoroacetone and the unsaturated epoxide is allyl glycidyl ether.
7. The curable polymer of claim 1 wherein the perhaloacetone is perfluoroacetone and the unsaturated epoxide is butadiene monoepoxide.
8. The curable polymer of claim 1 wherein the perhaloacetone is perfluoroacetone, the unsaturated epoxide is allyl glycidyl ether and the alkylene oxide is propylene oxide.
9. The curable polymer of claim 1 wherein the perhaloacetone is perfluoroacetone and the alkylene oxide is a mixture of ethylene oxide and propylene oxide.

References Cited
UNITED STATES PATENTS 3,316,216    4/1967    Fawcett et al. _____ 260—63

WILLIAM H. SHORT, Primary Examiner

L. L. LEE, Assistant Examiner

U.S. Cl. X.R.

260—79, 79.5, 615, 886